United States Patent
Scherzer et al.

(10) Patent No.: US 6,649,729 B1
(45) Date of Patent: Nov. 18, 2003

(54) NOVOLAKS AS WATER-UNAFFECTED ACCELERATORS FOR EPOXY RESIN HARDENERS

(75) Inventors: Wolfgang Scherzer, Bergkamen (DE); Jörg Volle, Selm/Bork (DE)

(73) Assignee: Vantico GmbH & Co. KG, Bergkamen (DE)

( * ) Notice: Subject to any disclaimer, the term of this patent is extended or adjusted under 35 U.S.C. 154(b) by 0 days.

(21) Appl. No.: 09/554,811

(22) PCT Filed: Nov. 28, 1998

(86) PCT No.: PCT/EP98/07703

§ 371 (c)(1), (2), (4) Date: May 19, 2000

(87) PCT Pub. No.: WO99/29757

PCT Pub. Date: Jun. 17, 1999

(30) Foreign Application Priority Data

Dec. 8, 1997 (DE) .......................... 197 54 393

(51) Int. Cl.$^7$ .............................. C08G 59/56
(52) U.S. Cl. ............... 528/93; 523/406; 523/456; 525/423; 525/486; 525/488; 525/533; 528/93; 528/121; 528/123
(58) Field of Search ............. 528/93, 121, 123; 525/423, 486, 488, 533; 523/406, 456

(56) References Cited

U.S. PATENT DOCUMENTS 3,288,747 A    11/1966    Sussman ................. 260/37

FOREIGN PATENT DOCUMENTS

| DE | 1545191 | 3/1970 |
| DE | 3508600 | 9/1986 |
| EP | 0365479 | 4/1990 |
| JP | 06-085117 | * 3/1994 |
| JP | 08120161 | 5/1996 |

OTHER PUBLICATIONS

Patent Abstracts of Japan Publication No. 06085117, Mar. 1994.

Patent Abstracts of Japan Publication No. 08120161, May 1996.

* cited by examiner

*Primary Examiner*—Robert Dawson
*Assistant Examiner*—D. Aylward
(74) *Attorney, Agent, or Firm*—Proskauer Rose, LLP; James H. Shalex, Esq.; Kristin H. Neuman, Esq.

(57) ABSTRACT

Curable mixtures based on epoxy resins and amine hardeners, if required additionally using solvents, water, plasticisers, UV stabilisers, colourants, pigments, fillers, which mixtures contain as accelerator at least one compound of general formula (I), wherein $R^1$, $R^2$, $R^3$, $R^4$ are each independently of one another H or an unbranched or branched alkyl radical containing 1 to 15 carbon atoms, and n is 0 to 10.

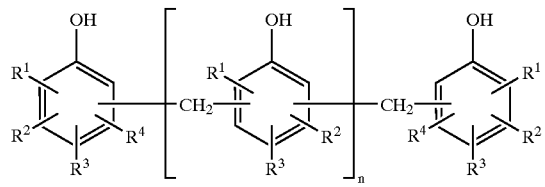

5 Claims, No Drawings

NOVOLAKS AS WATER-UNAFFECTED ACCELERATORS FOR EPOXY RESIN HARDENERS

Curable mixtures based on glycidyl compounds and amine hardeners are widely used in the industry for coating and improving metallic and mineral surfaces.

The amines used are, in particular, aliphatic, cycloaliphatic, aromatic or araliphatic compounds and, optionally, imidazoline group-containing polyaminoamides based on mono- or polybasic acids as well as adducts thereof.

These compounds are described in Lee & Neville, Handbook of Epoxy Resins, 1967, chapter 6/1 to 10/19.

Some of the curable mixtures based on epoxy resins and on said amine compounds have long curing times.

However, certain applications, especially in the adhesives field, require rapid curing. Acceleration is in many cases also indispensable in the area of the aminoamides/imidazolines, some of which have curing times of several days.

Tertiary amines, acids, hydroxylamines, Mannich bases and phenols are usually used to accelerate these hardeners.

Such accelerators are listed, inter alia, in Lee & Neville, Handbook of Epoxy Resins, 1967, chapter 10, table 10-9.

Bisphenol A (2,2-bis(4-hydroxyphenyl)propane) has been found to be particularly suitable since it additionally improves the early water resistance of the cured thermoset when used as accelerator additive. Bisphenol A is usually added in an amount of 1 to 25%, preferably of 10 to 20%, based on the hardener.

However, disadvantages have been found to be on the one hand the toxicological properties of bisphenol A (endocrinic modulation, oestrogenic effect) and, on the other hand, the high water susceptibility of the formulated hardener. If, to additionally accelerate the resin/hardener system, 1 to 5% of water are added, then the bulk of the dissolved bisphenol A precipitates again in salt form.

The same happens if the hardener absorbs minor amounts of water owing to high atmospheric humidity or for other reasons. Even an absorption of less than 1% of water may, depending on the proportion of dissolved bisphenol A in the hardener, result in the crystallisation of the bisphenol A salt. This is a major disadvantage since the hardener can no longer be processed or must be worked up again at great expenditure.

Accordingly, it is the object of this invention to provide an accelerator which, while having a comparably good accelerating effect and early water resistance, is toxicologically safe and not affected by water being added or adsorbed to the hardener in the range of up to 5%. Surprisingly, it has been found that novolaks of the general formula I are capable of over-coming the above disadvantages also at higher molecular weights and that they are unaffected by addition of water in the range of up to 5 g of water/100 g of hardener formulation while having a comparably good acceleration effect and early water resistance.

This invention therefore relates to curable mixtures based on epoxy resins and amine hardeners, if required additionally using solvents, water, plasticisers, UV stabilisers, colourants, pigments, fillers, which mixtures preferably contain as accelerator 1 to 25% by weight, particularly preferably 10 to 20% by weight, based on the hardener or amine hardener, of at least one compound of the general formula I

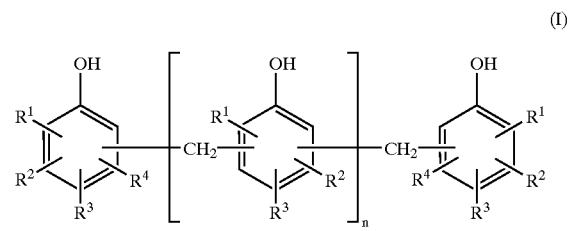

wherein $R^1$, $R^2$, $R^3$, $R^4$ are each independently of one another H or an unbranched or branched alkyl radical containing 1 to 15 carbon atoms, and n is 0 to 10.

In the curable mixtures according to the invention, the novolaks of formula I are used in amounts of 1 to 25% by weight, particularly preferably 10 to 20% by weight, based on the hardener or amine hardener.

Other subject matters of this invention are characterised by the claims.

The novolaks additionally used in accordance with this invention can be prepared by processes known per se by reacting formaldehyde and phenols, such as phenol, cresol, xylenol, alkylphenol and the like, if required additionally using a catalyst, for example oxalic acid, with elimination of water.

Such products are described, inter alia, in Houben-Weyl, 4$^{th}$ edition, Methoden der Organischen Chemie, Vol. E 20, Makromolekulare Stoffe, Part 3, pages 1800–1806.

To prepare these products, the phenol is generally placed in a vessel with addition of water—sufficient to dissolve phenol and formaldehyde—and of catalytic amounts of oxalic acid, subsequently adding formaldehyde, preferably paraformaldehyde, in portions. The volatile components are then removed by distillation under reduced pressure.

The novolaks obtained are statistical mixtures wherein n=0 to 10, preferably n=1 to 3. The range of the average value of n can be determined by using the phenolic component in a suitable excess amount to the amount of formaldehyde used.

The epoxy compounds additionally used according to this invention for the preparation of the curable mixtures are commercially available products containing more than one epoxy group per molecule and are derived from mono—and polyvalent, mono—and/or polynuclear phenols, in particular bisphenols, and from novolaks. An extensive enumeration of these di- and polyphenols is to be found in the compendium "Epoxidverbindungen and Epoxidharze" by A. M. Paquin, Springer Verlag, Berlin, 1958, chapter IV, and in Lee & Neville, "Handbook of Epoxy Resins", 1967, chapter 2, pages 257–307.

It is also possible to use mixtures of two or more epoxy resins. It is preferred to use glycidyl compounds based on bisphenol A having epoxy values of 0.4 to 0.56. Mixtures of the epoxy resins with so-called reactive diluents, e.g. monoglycidyl ethers of phenols or of mono- or difunctional aliphatic or cycloaliphatic alcohols, can also be used. These reactive diluents primarily serve to reduce the viscosity and should only be used in small amounts as they adversely affect the end properties of the thermoset. The epoxy resins mentioned as examples can be used both for the curable mixtures and for the preparation of the hardener-epoxy adducts which may be used.

The hardeners for epoxy resins additionally used according to this invention are aliphatic, cycloaliphabc, araliphatic or aromatic amines, optionally imidazoline group-containing amino-amides and their adducts with glycidyl compounds, which contain on average more than two reactive active hydrogens bound to amino nitrogen atoms per molecule. These compounds are part of the general state of the art and are described, inter alia, in Lee & Neville, "Handbook of Epoxy Resins", MC Graw Hill Book Company, 1987, chapter 6-1 to 10-19.

Hardeners and epoxy compounds are preferably used in about equivalent amounts, i.e. based on active hydrogens bound to amino nitrogen atoms and reactive epoxy groups. However, it is also possible to use the hardener or glycidyl component in more or in less than the equivalent amount. The amounts used depend on the desired final properties of the reaction product. Standard catalytic hardeners for epoxy resins can be used in addition to the inventive accelerators.

Depending on the field of application and on the end use requirements it is also possible to additionally add to the novel epoxy resin/hardener mixtures inorganic and/or organic additives, such as finely particulate sands, talcum, silicic acid, alumina, metal or metal compounds in chip and powder form, thixotropic agents, fibrous substances (e.g. asbestos and glass-staple fibres), pigments, flame-retarding agents, solvents, colourants, plasticisers, bitumen, mineral oils.

EXAMPLES

Example 1

Preparation of the Novolaks a) 1880 g (20 mol) of phenol are melted in a reaction vessel and are charged, with stirring, with 50 g of oxalic acid. After adding 400 g of water, the mixture is heated to 85 to 90 °C. and then 468 g of paraformaldehyde ($\cong$15.6 mol) are added in 5 to 6 portions. After stirring the batch for 3 hours (h) at 85 to 90° C., water, reaction water and excess phenol are removed by distillation under reduced pressure at a sump temperature of 160° C. 1968 g of a novolak having a softening point of~125 ° C. remain in the reaction vessel.

b) 1880 g phenol (20 mol) are reacted with 150 g (5 mol) of paraformaldehyde by the process described in Example 1a). This gives 793 g of a novolak having a softening point of~65° C.

c) 1080 g of cresol (10 mol) are reacted with 75 g (2.5 mol) of paraformaldehyde by the process described in Example 1a).
This gives 395 g of a novolak having a softening point of~60° C.

Example 2

Comparison Examples

Preparation of Hardeners Accelerated with Bisphenol A a) 25 g of isophoronediamine, 21 g of xylylenediamine and 30 g of benzyl alcohol are placed in a vessel. 18 g of bisphenol A and 4 g of salicylic acid are added at 60 to 70° C. and are completely dissolved after further heating to 90 to 100° C.

b) 50 g of diethylenetriamine are placed in a vessel. At 60 to 80 ° C., 30 g of a diglycidyl ether of bisphenol A, having an epoxy value of about 0.535, are added over 30 min with cooling. After stirring for 15 min, 20 g of bisphenol A are added and are completely dissolved after heating to 90 to 100° C.

c) 40 g of an aminoimidazoline, prepared from triethylenetetramine and tall oil fatty acid at a molar ratio of 1:1 and having an imidazoline content of >60%, and 15 g of benzyl alcohol are placed in a vessel. At 60 to 80° C., 10 g of cresyl glycidyl ether are added with cooling. After stirring for 15 min, 15 g of bisphenol A are added and are completely dissolved after heating to 90 to 100° C.

Example 3 a) The novolak described in Example 1a) is added to the hardener of Example 2a) in exchange for bisphenol A.

b) The novolak described in Example 1b) is added to the hardener of Example 2a) in exchange for bisphenol A.

c) The novolak described in Example 1c) is added to the hardener of Example 2a) in exchange for bisphenol A.

d) The novolak described in Example 1b) is added to the hardener of Example 2b) in exchange for bisphenol A.

e) The novolak described in Example 1b) is added to the hardener of Example 2c) in exchange for bisphenol A.

Test Methods

Water Test 100 g of the hardener formulation are charged with 1 g, 2 g and 5 g each of distilled water and the mixture is homogenised. The samples are stored for 30 days at room temperature in a closed glass bottle. On each of the following days visual assessment is carried out to see if crystals have formed in the samples. The samples marked with "K" crystallise after the number of days indicated in brackets ( ). The samples marked with "L" do not show any crystallisation after a 30 day storage.

Early Water Resistance

Preparation of the Samples:

The calculated amount of epoxy resins and amine hardeners are weighed into a mixing vessel and are vigorously mixed with a spatula for about 2 min without working in any excess air. Local inhomogeneities show as streaks and are to be avoided.

A 500 $\mu$m film transfer frame, of Erichsen, is placed on a glass plate which has been cleaned first with acetone and then dried, and this frame is then filled with about 15 g of the reactive mixture and drawn evenly over the free area. The freshly coated glass plates are immediately laid out in the corresponding climatic chambers, typically at relative atmospheric humidity (r. h.)

at 23° C./r. h. about 95%.

at 10° C./r. h. about 80% at 5° C./r. h.>70%.

After curing for 24 hours, the glass plates are taken back to the test laboratory for assessment of their surface.

Each test is rated (in accordance with DIN 53230):

0=no flaws up to 5=most flaws.

Graduations of 0.5 are possible for fine differentiation e.g. with comparison samples.

On each plate, about 0.5 ml of completely desalted water is applied to one spot using a pipette and is then dabbed off after 60 min with cellulose.

The extent of coloration/blushing of the film at the spot exposed to water is assessed.

TABLE

| | Example | | | | | | | |
|---|---|---|---|---|---|---|---|---|
| | 2a | 2b | 2c | 3a | 3b | 3c | 3d | 3e |
| Water test | | | | | | | | |
| water added/100 g of hardener | | | | | | | | |
| 1 g | K(2) | K(2) | L | L | L | L | L | L |
| 2 g | K(1) | K(1) | K(4) | L | L | L | L | L |
| 5 g | K(1) | K(1) | K(1) | L | L | L | L | L |
| Early water resistance | | | | | | | | |
| °C./% rel. air humidity | | | | | | | | |
| 23/95 | 0.5 | 1 | 1.5 | 0.5 | 0.5 | 1 | 1 | 1.5 |
| 10/80 | 1 | 1.5 | 1.5 | 1 | 1.5 | 1 | 1.5 | 2 |
| 5/>70 | 2 | 2 | 2.5 | 1.5 | 2 | 1.5 | 2 | 2.5 |

What is claimed is:

1. A curable mixture comprising
   (a) one or more epoxy resins;
   (b) one or more hardeners selected from the group consisting of aliphatic, cycloaliphatic, or araliphatic amines, and imidazoline group-containing aminoamides and their adducts with glycidyl compounds, which contain on average more than two reactive active hydrogens bound to amino nitrogen atoms per molecule;
   (c) at least one accelerator compound of Formula I:

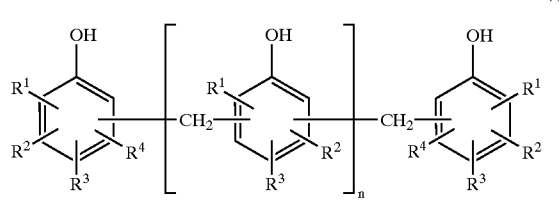

(I)

wherein $R^1$, $R^2$, $R^3$, $R^4$ are each independently of one another H or an unbranched or branched alkyl radical containing 1 to 15 carbon atoms, and n is 0 to 10, and wherein the accelerator compound(s) of Formula I are used in amounts of from 1 to 25% by weight based on the hardener; and
   (d) optionally comprising solvents, water, plasticisers, UV stabilisers, colourants, pigments, or fillers.

2. A curable mixture according to claim 1, wherein $R^1$, $R^2$, $R^3$ and $R^4$ are H.

3. A curable mixture according to claim 1, wherein one or two of the radicals $R^1$ to $R^4$ are the radical—$CH_3$.

4. A curable mixture according to claim 1, wherein one of the radicals $R^1$ to $R^4$ is a tert-butyl radical.

5. A curable mixture according to claim 1, wherein one of the radicals $R^1$ to $R^4$ is a long-chain, unbranched or branched alkyl radical containing 9 to 12 carbon atoms.

* * * * *